United States Patent [19]

Kang et al.

[11] 4,330,689
[45] May 18, 1982

[54] MULTIRATE DIGITAL VOICE COMMUNICATION PROCESSOR

[75] Inventors: George S. Kang, Silver Spring; Lawrence J. Fransen, Churchton, both of Md.; Evans L. Kline, Springfield, Va.

[73] Assignee: The United States of America as represented by the Secretary of the Navy, Washington, D.C.

[21] Appl. No.: 115,860

[22] Filed: Jan. 28, 1980

[51] Int. Cl.³ .............................................. G10L 1/00
[52] U.S. Cl. ............................. 179/15.55 R; 370/84; 179/1.5 R
[58] Field of Search ................ 179/15.55 R, 1.5 A, 179/1.5 R; 370/84, 106, 112, 43; 375/112

[56] References Cited

U.S. PATENT DOCUMENTS

| | | | |
|---|---|---|---|
| 3,752,933 | 8/1973 | Cohen et al. | 370/84 |
| 3,975,587 | 8/1976 | Dunn et al. | 179/1 SA |
| 3,982,077 | 9/1976 | Clark et al. | 370/84 |
| 3,987,251 | 10/1976 | Texier et al. | 370/84 |
| 4,131,765 | 12/1978 | Kahn | 179/15.55 R |
| 4,216,354 | 8/1980 | Esteban | 179/1 SA |

*Primary Examiner*—Errol A. Krass
*Assistant Examiner*—E. S. Kemeny
*Attorney, Agent, or Firm*—Robert F. Beers; William T. Ellis; Vincent Ranucci

[57] ABSTRACT

To provide alternative operation at 2.4 or 9.6 Kb/s bit rates, a multirate digital processor generates a data frame of 216 bits representing sync and voice encoded at both rates, with the 2.4 Kb/s embedded as a subset within the frame. Rate conversion is made by inserting or deleting 162 bits per frame. Speech signal is transformed by linear prediction into coefficients and residual signals. The coefficients are transmitted similarly at both 2.4 and 9.6 Kb/s rates. However, the residual is processed into a simple pitch/hiss excitation signal for 2.4 Kb/s, but is processed into a Fourier transform of its baseband (250-1500 Hz) for 9.6 Kb/s excitation signal transmission.

15 Claims, 7 Drawing Figures

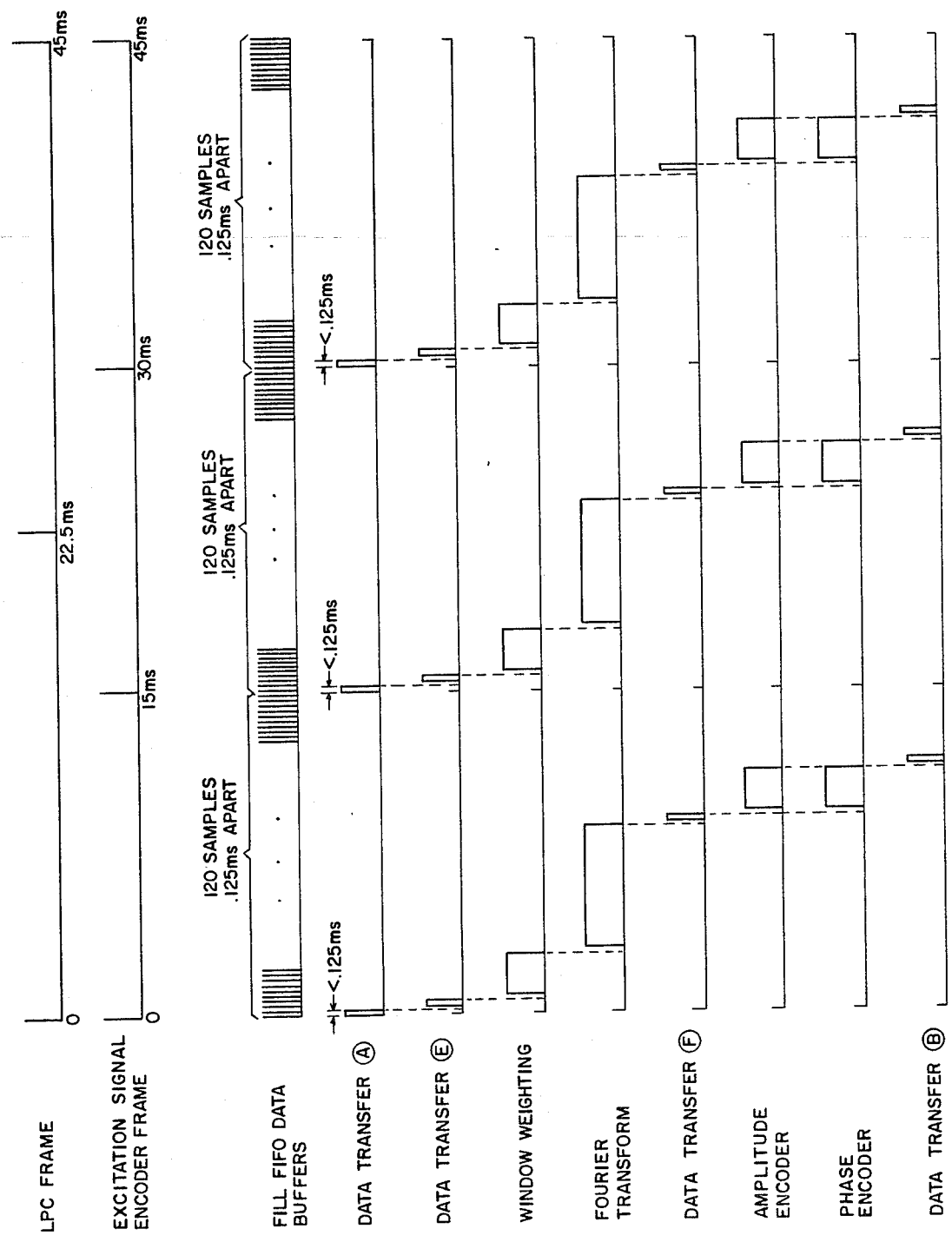

MULTIRATE DIGITAL VOICE COMMUNICATION PROCESSOR

BACKGROUND OF THE INVENTION

This invention relates generally to digital voice communication and more particularly to a multirate digital communication processor which provides an improved quality of speech at a data rate of 9.6 kilobits per second (kbps), and interoperability among systems that operate at 2.4 kbps and 9.6 kbps.

Voice communications are being increasingly encoded by digital, rather than analog, techniques because digital encryption for security purposes is both easier and less vulnerable to unauthorized decryption.

The choice of a data rate for processed speech is dependent upon such factors as speech quality requirements, availability of transmission channel bandwidth, availability of equipment, and leased-line costs. Although wideband systems which operate at 32 kbps or greater have virtually no degradation in speech quality, availability of these wideband trunks and access lines is limited. Therefore, some users must rely on narrowband channels. A solution is to use two different voice processors, one for wideband at 16 kbps/32 kbps and the other for narrowband at 2.4 kbps. However, there must be a tandeming process to allow the two incompatible voice processors to communicate with each other. Existing tandeming processes require digital-to-analog and analog-to-digital conversions. These conversions degrade speech intelligibility and quality. Degradation is even more severe if speech is contaminated by background noise. More importantly, regarding secure voice communications, the presence of an analog interface prevents end-to-end security from being achieved since speech data must be decrypted at the tandem junction. The present invention generates a data stream of 2.4 kbps which is embedded within a data stream of 9.6 kbps. This embedded data structure eliminates the need for analog tandeming between high- and low-data-rate users because the rate conversion is effected directly on the bit stream.

A multirate processor for generating an embedded data stream of 2.4 kbps within 9.6 kbps cannot be formed by combining a 2.4 kbps voice processor and a 7.2 kbps voice processor, because existing 7.2 kbps processors are not capable of producing an acceptable quality of speech.

In addition, existing 9.6 kbps processors are not adaptable for changing the data rate without extensive and complex modifications.

SUMMARY OF THE INVENTION

It is the general purpose and object of the present invention to provide compatible low-data-rate and high-data-rate modes (2.4 kbps for narrowband channels and 9.6 kbps for wideband channels, respectively) for interoperating narrowband and wideband channels without degrading the intelligibility and quality of transmitted speech, and also for achieving end-to-end security of the transmitted data.

Another object of this invention is to process 9.6 kbps to provide higher speech intelligibility and quality than is achieved with existing 9.6 kbps voice processors.

These and other objects of the present invention are accomplished by embedding a data stream of 2.4 kbps within a data stream of 9.6 kbps. The digital voice processor operates at a high data-rate of 9.6 kbps and a low data-rate of 2.4 kbps, and has a wideband excitation signal coder and decoder for processing the prediction residual waveform component of speech such that the speech being processed at 9.6 kbps includes the speech being processed at 2.4 kbps as a subset. The high data-rate comprises a set of 216 bits per time frame and can be converted to the low data-rate by deleting 162 bits. Inserting the 162 bits converts the processor back to the high data-rate. The rate conversion may be made anywhere within the communication link.

The advantages of the present invention, hereinafter referred to as MRP for multirate processor, over existing voice processing systems are as follows:

a. The MRP with its embedded data structure provides interoperability among narrowband (2.4 kbps) and wideband (9.6 kbps) speech processing systems without analog tandeming between the systems, and thus, without any degradation of the quality of speech.

b. The high data-rate, 9.6 kbps, provides speech quality that is equivalent to or better than existing 9.6 kbps systems and the embedded narrowband mode (2.4 kbps) is compatible with other existing 2.4 kbps voice terminals.

c. The MRP maintains end-to-end security because the digital stream is not decrypted at tandem junctions.

d. The MRP system satisfies priority user requirements by providing re-routing options for wideband users in the event of network outages. For example, a wideband priority user may be re-routed on Government, public, or foreign analog, telephone networks. Also, a priority user may be shifted to a lower data-rate, thereby opening new communication links such as high-frequency channels.

e. During peak loading, greater channel utilization can be created by reducing the data-rates, rather than preempting some users.

f. Ease of conferencing is provided by the MRP. Narrowband and wideband users may simultaneously receive messages from narrowband or wideband users. Since there is no analog tandeming, the minimum speech quality attainable in a conference situation is equivalent to the speech quality of the 2.4 kbps mode.

g. A single voice processor for 2.4 kbps and 9.6 kbps assures simpler logistics and maintainability.

h. The data-rate can be changed (i.e., to 16 kbps) without complex modifications.

Other objectives and advantages of the present invention will become apparent from the following detailed description of the invention when considered in conjunction with the accompanying drawing wherein:

BRIEF DESCRIPTION OF THE DRAWING

FIG. 4 is a graphic illustration showing the process-timing of signals being processed by the wideband excitation signal encoder.

DETAILED DESCRIPTION OF THE INVENTION

Figure 1:
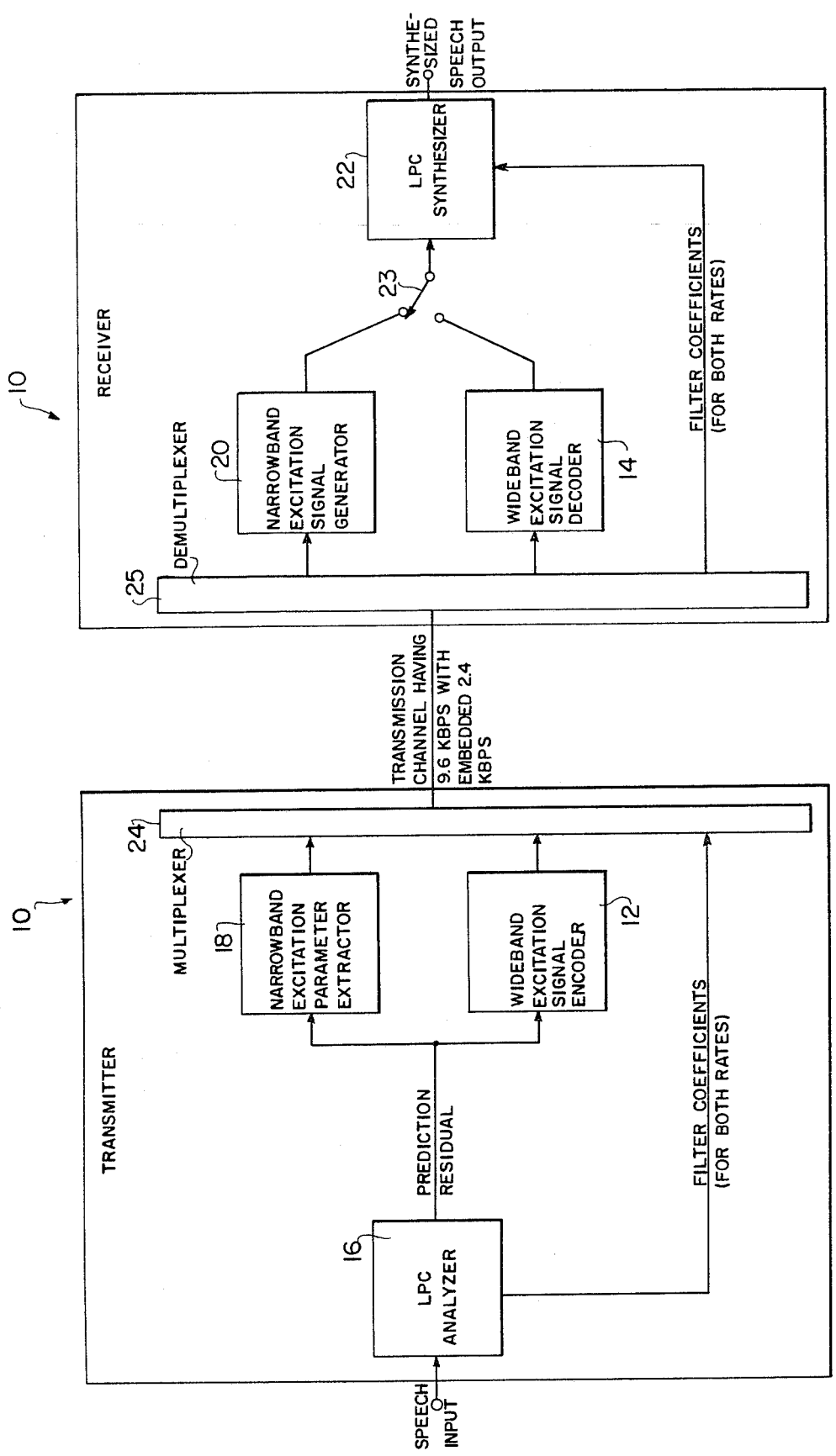
FIG. 1 is a block diagram of an MRP in accordance with the present invention, showing the wideband excitation signal encoder and decoder coupled to an existing 2.4 kbps narrowband processor.

The multirate processor (MRP) utilizes the principles of standard linear predictive coding (LPC). FIG. 1 is a block diagram of a MRP 10 in accordance with the present invention. The wideband excitation signal encoder 12 and wideband excitation signal decoder 14 are new devices and will be explained more fully hereinafter. The other units shown in FIG. 1 comprise a standard 2.4 kbps LPC voice processor. The LPC analyzer 16 and narrowband excitation parameter extractor 18 are shown in FIG. 1 as two separate units for ease of explanation but are typically one unit (transmitter) as described, for example, in the U.S. Pat. No. 3,715,512 to Kelly. The narrowband excitation signal generator 20 and LPC synthesizer 22 are also shown in FIG. 1 as two separate units but are typically one unit (receiver) as described, for example, in the U.S. Pat. No. 4,022,974 to Kelly. The multiplexer 24 and demultiplexer 25 are commonly part of the units comprising the transmitter and receiver, respectively. The encoder 12 and decoder 14 provide a 9.6 kbps voice processing capability to the standard 2.4 kbps LPC processor. The encoder 12 is part of the 9.6 kbps transmitter. The decoder 14 is part of the 9.6 kbps receiver. A switch 23 for selecting 2.4 kbps or 9.6 kbps synthesizer speech outputs is also part of the 9.6 kbps receiver. Typically, the LPC analyzer 16 decomposes a given speech waveform into two types of component waveforms. One type is a set of slowly time-varying components (i.e., predictive coefficients or filter coefficients) which represent the resonance characteristics of the vocal tract. The other type is a wideband signal, known in the art as the prediction residual, which is the difference between the actual and the predicted speech samples. The prediction residual is an ideal excitation signal for the LPC synthesizer 22 because the prediction residual produces a synthesis filter output at the synthesizer which is nearly identical to the output speech.

The MRP 10 produces two data rates: 2.4 kbps (for narrowband use) and 9.6 kbps (for wideband use). The essential difference between the 2.4 kbps mode and the 9.6 kbps mode of the MRP is how the prediction residual is processed and encoded as an excitation signal.

Figure 2:
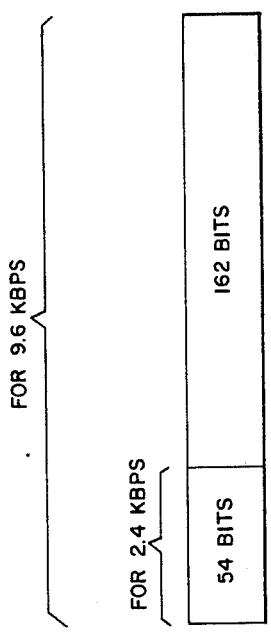
FIG. 2 illustrates the data structure of a frame of MRP encoded speech.

A frame of encoded speech of the high-data-rate mode (9.6 kbps) consists of 216 bits which is updated every 22.5 milliseconds (ms). The frame of the high-data-rate mode includes the frame of 54 bits for the low-data-rate mode (2.4 kbps) as a subset, as shown in FIG. 2.

The 54 bits represent the set of data required for the generation of 2.4 kbps speech as follows:
1 bit for synchronization;
41 bits for synthesis filter weights;
12 bits for excitation signal.

The 162 bits represent the supplementary data required for the generation of 9.6 kbps speech as follows:
3 bits for synchronization;
159 bits for an improved excitation signal.

The LPC analyzer 16 of FIG. 1 typically derives ten filter coefficients and a prediction residual for each input speech sample. While the filter coefficients are common to both data rates, the prediction residual is processed differently for each. For the 2.4 kbps mode, the prediction residual is modeled as one of two rudimentary signals: a pulse train for voiced sounds (i.e., vowels) and random noise for unvoiced sounds (i.e., consonants). In the 9.6 kbps mode, frequency components of the prediction residual in the range between approximately 250 Hz and 1500 Hz are transmitted.

The following description sets forth the means (encoder 12 and decoder 14) and method for encoding and decoding the prediction residual to generate highly intelligible 9.6 kbps speech.

The total bandwidth of the input speech signal is approximately 4000 Hz. The total bandwidth of the prediction residual signal is also approximately 4000 Hz. The baseband bandwidth of the prediction residual signal is selected in the range between approximately 250 and 1500 Hz.

Briefly, and as will be discussed in more detail hereinafter, the baseband of the prediction residual is transmitted in terms of amplitude and phase spectral components. Prior to transmission, both the amplitude and phase spectral components corresponding to the baseband are individually encoded. At the receiver, these components are decoded for input to an inverse Fourier transform. The baseband information is substituted for the missing upperband information prior to being fed to a device for performing an inverse Fourier transform. Since the actual prediction residual spectrum is relatively flat, translation of the baseband residual spectrum into the upperband spectrum provides a spectrum which closely approximates the prediction residual spectrum. The output of the inverse Fourier transform is used to generate an excitation signal for the LPC speech synthesizer 22.

Figure 3:
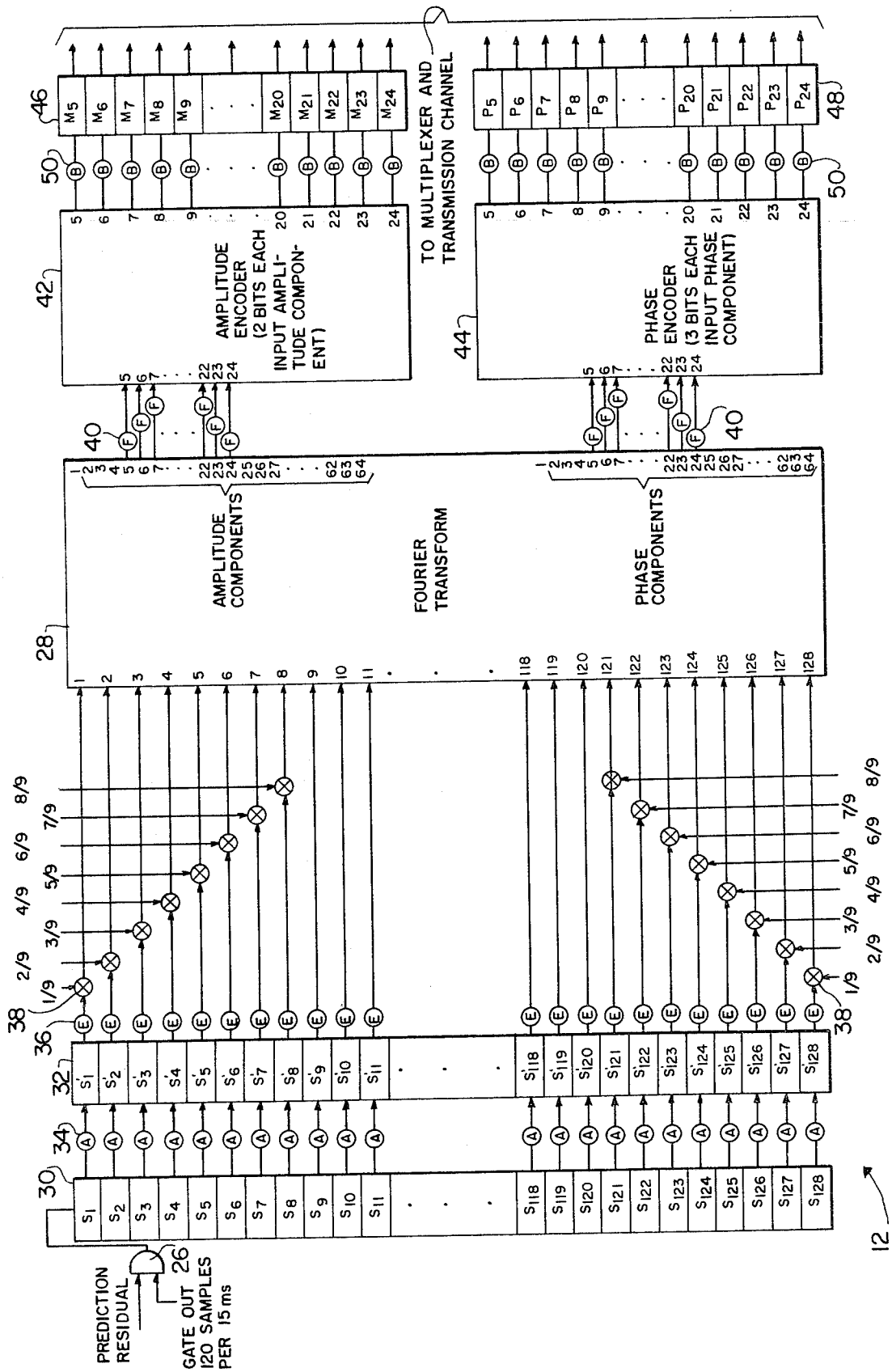
FIG. 3 is a schematic diagram of an embodiment of a wideband excitation signal encoder.

A schematic diagram of the encoder 12 is shown in FIG. 3. The process-timing of the encoder is indicated in FIG. 4. As shown in FIGS. 1 and 3, the input to the encoder 12 is the prediction residual output from the LPC analyzer 16. The prediction residual is fed to a gate 26 which produces an output of 120 prediction residual samples per 15 ms.

Figure 5:
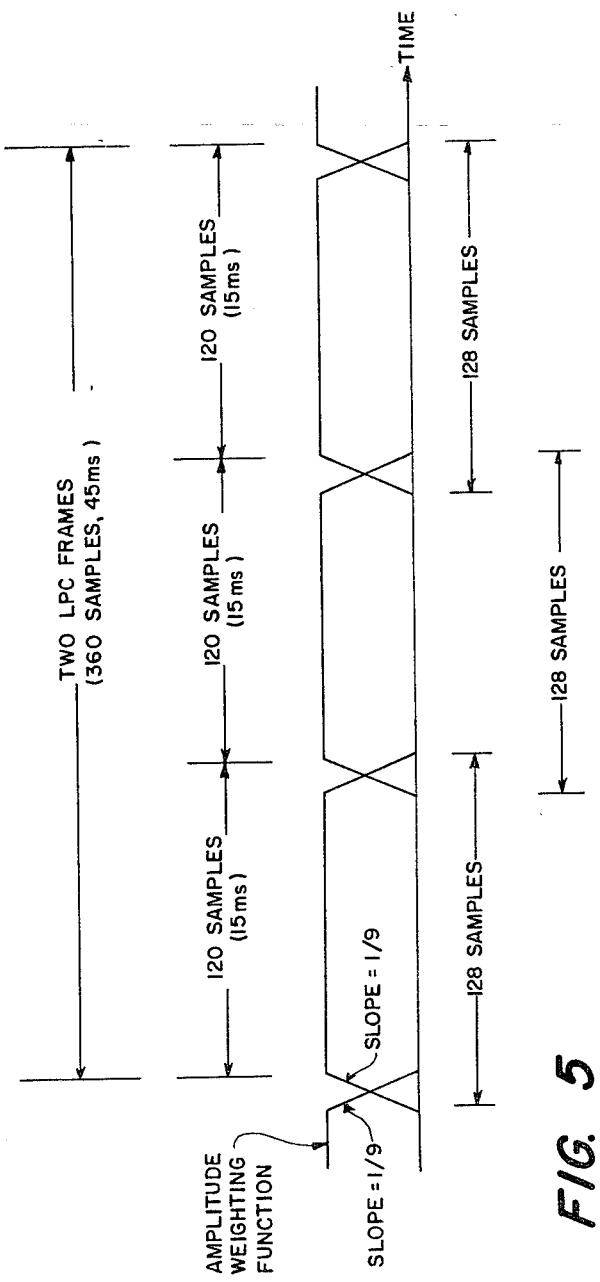
FIG. 5 is a graphic illustration showing the number of samples for encoder frames in reference to LPC frames.

The requirement for 120 samples per 15 ms is as follows: FIG. 4 indicates a typical LPC frame comprising 22.5 ms and an encoder frame comprising 15 ms. Standard LPC processes 180 input speech samples per 22.5 ms, or 360 samples per 45 ms, based on a speech sampling rate of 8 kHz (8000 speech samples per second). The encoder uses a device 28 for performing a Fourier transform, as shown in FIG. 3. For computational speed, the number of samples per frame is chosen at 128, or $2^7$, of which eight samples are overlapped with eight samples of a previous frame. The overlapping of eight samples results in 120 samples which is a submultiple of the total number of samples (360) contained in two LPC frames. Thus, excitation signal encoding is performed by the encoder three times for every two LPC frames. That is, in order to be compatible with an LPC system, the encoder analyzes 360 prediction residual samples per 45 ms at a rate of 120 samples per 15 ms. FIG. 5 illustrates the sampling relationship between encoder and LPC frames. The amplitude weighting function is described hereinafter.

As further shown in FIG. 3, the prediction residual samples from gate 26 are fed to a standard FIFO (first-in-first-out) data buffer 30. Each sample is passed to a temporary storage buffer 32 by a parallel transfer gate 34. Each sample is then delivered by a parallel transfer gate 36 to a Fourier transform device 28. Prior to input to the Fourier transform device each of samples 1–8 and 121–128 is passed through a time window or multiplier 38. The multipliers smooth the prediction residual waveform between the 15 ms time frames as shown in FIG. 5, by multiplying a sample by the fraction associated with a multiplier as indicated in FIG. 3. The multipliers thus scale the prediction residual prior to input to the Fourier transform device. The Fourier transform device typically requires a smooth waveform between time frames and any standard method for smoothing the waveform, in addition to that shown in FIG. 3, may be used.

The Fourier transform device computes amplitude and phase information. The present invention may comprise a Fourier transform device for processing a number of different input sample frame sizes, including 128 of $2^7$ samples, by simply altering the excitation encoder frame size. Any Fourier transform device may be employed with the encoder; however, a Fast Fourier Transform (FFT) device is preferred for its computational speed. The input speed bandwidth of approximately 4000 Hz includes the baseband bandwidth of 250 to 1500 Hz. The spectral components within the 4000 Hz bandwidth are separated by 62.5 Hz which is derived by dividing 4000 Hz by one-half of the input sample size (128, in this example) for the Fourier transform. Since there is a 62.5 Hz separation between spectral components, the baseband (250–1500 Hz) contains the fourth through the twenty-third frequency locations which correspond to the fifth through the twenty-fourth amplitude and phase component outputs of the Fourier transform device. Each fourth-through-the-twenty-third baseband spectral component for amplitude and phase is transferred by a parallel transfer gate 40 to an amplitude encoder 42 and phase encoder 44. The outputs from the amplitude and phase encoders are passed to parallel output buffers 46 and 48 respectively, by parallel transfer gates 50. The outputs from buffers 46 and 48 are transferred to the multiplexer 24 of FIG. 1 for transmission.

Figure 6:
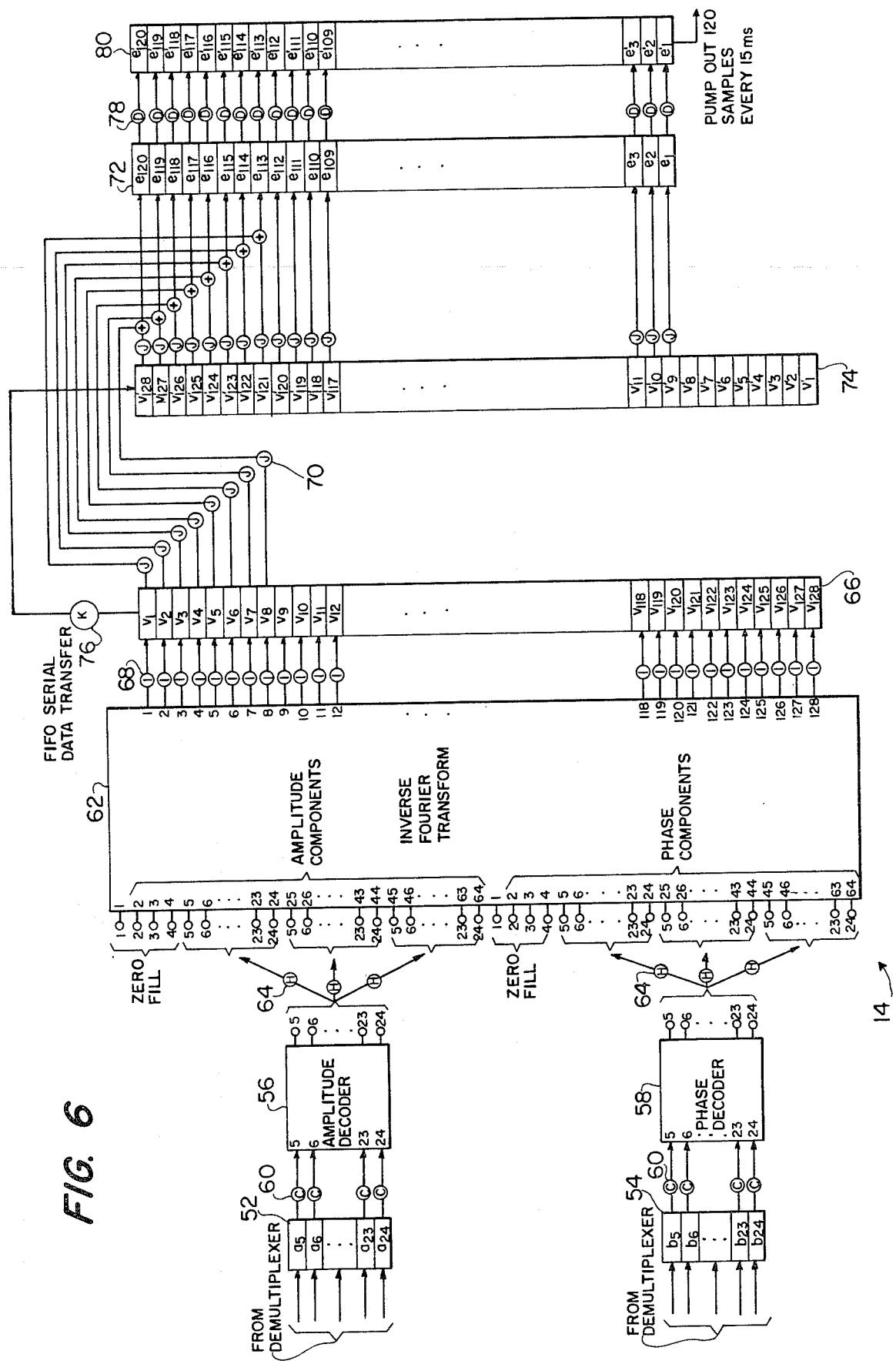
FIG. 6 is a schematic diagram of an embodiment of a wideband excitation signal decoder.
Figure 7:
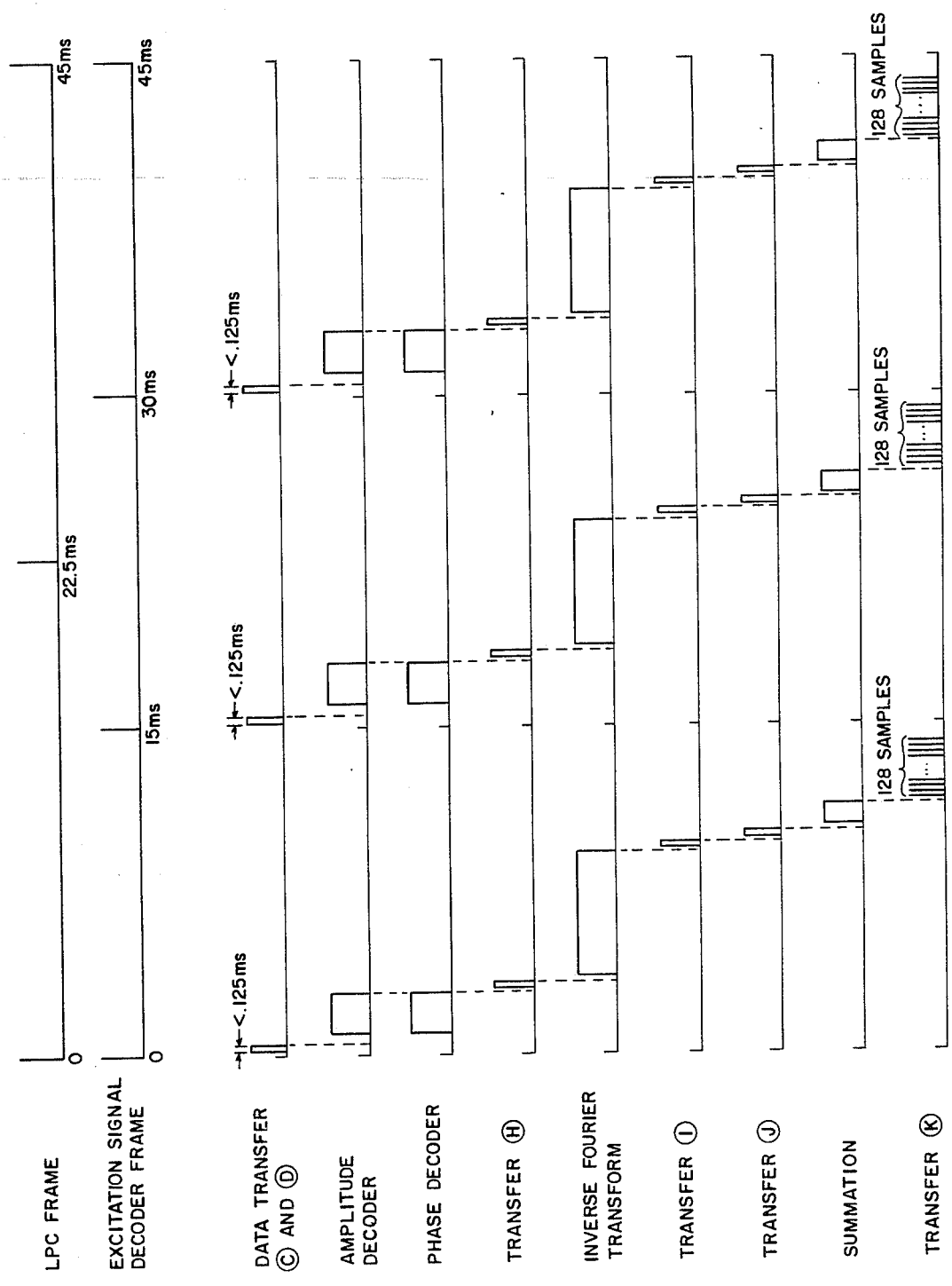
FIG. 7 is a graphic illustration showing the process-timing of signals being processed by the wideband excitation signal decoder.

A schematic diagram of the decoder is shown in FIG. 6. The process-timing of the decoder is indicated in FIG. 7. As shown in FIG. 6, the input to the decoder is the encoded baseband amplitude and phase components from the demultiplexer. The amplitude and phase components are fed to standard data buffers, 52 and 54 respectively. Each amplitude and phase component is transferred to an amplitude and phase decoder, 56 and 58 respectively, by a parallel transfer gate 60. The decoded baseband amplitude and phase components are passed to an inverse Fourier transform device 62 by parallel transfer gates 64. These decoded baseband amplitude and phase component inputs fill the baseband as well as the upperband input to the inverse Fourier transform and result in a high-quality, regenerated, excitation signal. Each output of the transform is delivered to a FIFO data buffer 66 by a parallel transfer gate 68. Parallel transfer gates 70 truncate eight of the 128 samples to achieve a 120 sample array in a storage buffer 72. Subsequent to truncation by the gates 70, the summation of the components results in frame-to-frame smoothing of the reconstructed prediction residual. After the buffer 72 has been filled by the gates 70, the buffer 74 is filled by a FIFO serial data transfer gate 76. A parallel transfer gate 78 transfers each sample from the buffer 72 to an output data buffer 80. The parallel transfers of gates 60 and 78 occur just after the beginning of a decoder frame at 15 ms intervals. The decoder provides an output of 120 samples per 15 ms time frame.

This output is a reconstructed approximation of the prediction residual for input as an excitation signal to the LPC synthesizer 22 as shown in FIG. 1. Gates 70, 76 and 78 and buffers 72, 74 and 80 provide a typical method for truncating the 128 sample output of the inverse Fourier transform device to 120 samples and smoothing the truncated signal for use as an excitation signal. However, any standard method for truncating the number of samples from 128 to 120 and frame-to-frame smoothing the resultant signal may be employed. A Fourier transform device other than a fast Fourier transform device may not require truncating the number of samples, but smoothing the resultant signal is required.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A multirate digital voice communication processor for generating and utilizing a high data-rate digital signal with a low data-rate subset therein to permit the direct processing of this signal at both wideband and narrowband processors without analog tandeming comprising:
    a speech input;
    a linear predictive coding processor for decomposing an input speech signal into filter coefficient components and a prediction residual component;
    a narrowband excitation parameter extractor for representing said prediction residual component by a low data-rate digital signal;
    a wideband excitation signal encoder for representing said prediction residual component by a high data-rate digital signal;
    means for multiplexing into a data stream and transmitting said filter coefficient components, said narrowband low data-rate digital signal, and said wideband high data-rate digital signal;
    means for receiving a transmitted encoded signal and demultiplexing said filter coefficient components and said low and high data-rate digital signals therefrom; and
    means for decoding said demultiplexed encoded signals and reconstructing an approximation of the original speech prior to encoding.

2. A multirate digital voice communication processor as defined in claim 1, wherein wideband excitation encoder includes:
    means for determining the amplitude and phase spectral components of said prediction residual component; and,
    means for representing these spectral components by said high data-rate digital signal.

3. A multirate digital voice communication processor as defined in claim 2, wherein said decoding means comprises:
    means connected to said receiving and demultiplexing means for processing narrowband low data-rate digital signals,
    means connected to said receiving and demultiplexing means for reconstructing an approximation of said prediction residual component from the amplitude and phase spectral components represented by said high data-rate digital signal; and synthesizing means for utilizing said filter coefficient components and either the processed narrowband low data-rate digital signal from said narrowband processing means or the reconstructed approximation of said prediction residual component from said reconstructing means to produce an output speech signal approximately corresponding to an input speech signal.

4. A multirate digital voice processor as defined in claim 3, wherein said wideband excitation signal encoder includes means for representing by said high data rate digital signal only the lower range or baseband of the total spectral bandwidth of the amplitude and phase spectral components.

5. A multirate digital voice processor as defined in claim 4, wherein said prediction residual reconstructing means includes means for replicating in the lower and the various upper spectral bandwidths the amplitude and phase spectral components from the encoded lower range of the spectral bandwidth in order to reconstruct said prediction residual component.

6. A multirate digital voice processor as recited in claim 5, wherein the high data-rate for said high data-rate digital signal is 9.6 Kbps and comprises a set of 216 bits per frame of time, and the low data-rate for said low data-rate digital signal is 2.4 kbps and comprises 13 bits for the narrowband excitation parameter plus 41 bits for said filter coefficient components as a subset of said high data-rate, said high data-rate being converted to said low data-rate by deleting 162 bits per frame of time from the high data-rate, and the low data-rate being converted to the high data-rate by inserting 162 bits per frame of time.

7. A multirate digital voice processor as recited in claim 5, wherein said encoding means comprises:
first gating means for forming a number of samples of said prediction residual per frame of time;
first data buffering means for receiving said samples from the first gating means;
second data buffering means for storing said samples;
second gating means for transferring said samples from the first buffering means to the second buffering means;
Fourier transform means for converting said samples of the prediction residual to said amplitude and phase spectral components;
third gating means for transferring said samples of the prediction residual from said second data buffering means to said Fourier transform means;
multiplier means for scaling said samples prior to input to the Fourier transform means to facilitate waveform smoothing;
amplitude encoding means for encoding said amplitude spectral components;
phase encoding means for encoding said phase spectral components;
fourth gating means for transferring only a selected number (less than half) of contiguous amplitude and phase components from the Fourier transform means to said amplitude and phase encoding means respectively;

third data buffering means for storing the encoded amplitude and phase components for the transmission thereof; and
fifth gating means for transferring said encoded baseband components from said amplitude and phase encoding means to said third data buffering means.

8. A multirate digital voice processor as recited in claim 5, wherein said decoding means comprises:
fourth data buffering means for storing the transmitted encoded lower spectral or baseband amplitude and phase components;
amplitude decoding means for decoding said encoded baseband amplitude components;
phase decoding means for decoding said encoded baseband phase components;
sixth gating means for transferring said encoded baseband amplitude and phase components from said fourth data buffering means to said amplitude and phase decoding means respectively;
inverse Fourier transform means for receiving said decoded baseband amplitude and phase components from the amplitude and phase decoding means, respectively;
seventh gating means for transferring said decoded baseband amplitude and phase components from the amplitude and phase decoding means, respectively, to fill their respective baseband spectral inputs and to also to fill the upperband spectral inputs of said inverse Fourier transform means in order to permit the conversion of said amplitude and phase spectral components to an approximation of the prediction residual component;
fifth data buffering means for storing the output of the inverse Fourier transform means;
eight gating means for transferring the output of the inverse Fourier transform means to said fifth data buffering means;
means for smoothing said output of the inverse Fourier transform means for use as an excitation signal.

9. A multirate digital voice processor as recited in claim 7, wherein said first data buffering means is a FIFO data buffer.

10. A multirate digital voice processor as recited in claim 7, wherein said second, third, fourth and fifth gating means are parallel transfer gates.

11. A multirate digital voice processor as recited in claim 7, wherein said third data buffering means comprises a parallel output buffer for storing said encoded baseband amplitude components, and a parallel output buffer for storing said encoded baseband phase components.

12. A multirate digital voice processor as recited in claim 7, wherein said Fourier transform means is a fast Fourier transform means.

13. A multirate digital voice processor as recited in claim 8, wherein said sixth, seventh and eighth gating means are parallel transfer gates.

14. A multirate digital voice processor as recited in claim 8, wherein said fifth data buffering means is a FIFO data buffer.

15. A multirate digital voice processor as recited in claim 8, wherein said inverse Fourier transform means is an inverse fast Fourier transform means, and said decoding means comprises means for truncating the output of said inverse fast Fourier transform means.

* * * * *